(12) United States Patent
Li et al.

(10) Patent No.: US 8,422,112 B2
(45) Date of Patent: Apr. 16, 2013

(54) DISPLAY SYSTEM

(75) Inventors: Yu-Tang Li, Tucheng (TW); Wan-Chien Huang, Erluh Township, Yunlin County (TW); Chun-Chuan Lin, Hsinchu (TW); Hsin-Hsiang Lo, Jhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 266 days.

(21) Appl. No.: 12/866,136

(22) PCT Filed: Feb. 4, 2008

(86) PCT No.: PCT/CN2008/000312
§ 371 (c)(1),
(2), (4) Date: Aug. 24, 2010

(87) PCT Pub. No.: WO2009/100576
PCT Pub. Date: Aug. 20, 2009

(65) Prior Publication Data
US 2010/0315577 A1 Dec. 16, 2010

(51) Int. Cl.
*G02F 1/03* (2006.01)
*G02F 1/01* (2006.01)
(52) U.S. Cl.
USPC ........... 359/246; 359/247; 359/251; 359/279; 349/96; 349/9; 349/62; 349/113
(58) Field of Classification Search .......... 359/245–247, 359/251; 349/9, 33, 62, 63, 67, 96, 113, 349/117, 158; 362/19, 268; 353/38
See application file for complete search history.

(56) References Cited

U.S. PATENT DOCUMENTS

| 4,606,638 A | * | 8/1986 | Sommargren ................ 356/492 |
| 5,212,471 A | | 5/1993 | McDonald |

(Continued)

FOREIGN PATENT DOCUMENTS

| CN | 1165963 | 11/1997 |
| CN | 1281998 | 1/2001 |

(Continued)

OTHER PUBLICATIONS

Chinese language office action dated Oct. 26, 2011.

(Continued)

*Primary Examiner* — Loha Ben
(74) *Attorney, Agent, or Firm* — McClure, Qualey & Rodack, LLP (57) ABSTRACT

A display system 1 is composed of a ghost image reducing device 100 and an image device 10. The ghost image reducing device 100 comprises an image reflecting element 110 and a polarizing element 120. The image reflecting element 110 includes a substrate 112 and a phase modulating element 114 which is adjacent to the substrate 112 and has a reflecting surface 114a. The image device 10 generates a polarized image light P1 which is received by the reflecting surface 114a. Then, a portion of the polarized image light P1 is reflected by the reflecting surface 114a for producing a first reflecting polarized image light P2, another portion of the polarized light P1 is projected into the phase modulating element 114 and reflected by the substrate 112 for producing a second reflecting polarized image light S2 whose polarizing direction is different from that of the first reflecting polarized image light P2.

20 Claims, 4 Drawing Sheets

U.S. PATENT DOCUMENTS

| | | | |
|---|---|---|---|
| 5,510,913 A | 4/1996 | Hashimoto et al. | |
| 5,982,541 A * | 11/1999 | Li et al. | 359/242 |
| 5,999,314 A | 12/1999 | Asakura | |
| 6,650,382 B1 * | 11/2003 | Sumida et al. | 349/63 |
| 6,744,478 B1 | 6/2004 | Asakura et al. | |
| 6,801,263 B2 * | 10/2004 | Sato et al. | 349/15 |
| 6,867,830 B1 * | 3/2005 | Hirota et al. | 349/96 |
| 6,952,312 B2 | 10/2005 | Weber | |
| 7,123,418 B2 | 10/2006 | Weber | |
| 7,643,053 B2 * | 1/2010 | Shimizu et al. | 348/113 |
| 7,773,163 B2 * | 8/2010 | Shimizu et al. | 349/9 |
| 2005/0012682 A1 | 1/2005 | Jenson et al. | |

FOREIGN PATENT DOCUMENTS

| | | |
|---|---|---|
| CN | 1442749 | 9/2003 |
| CN | 1847974 | 10/2006 |
| JP | 10186507 | 7/1998 |
| JP | 2005115112 | 4/2005 |

OTHER PUBLICATIONS

Chinese language office action dated Apr. 21, 2011.
International Search Report and Written Opinion issued Nov. 20, 2008.

* cited by examiner

DISPLAY SYSTEM

This application is the 35 U.S.C. §371 national stage of PCT application PCT/CN2008/000312, filed Feb. 4, 2008, the disclosure of which is hereby incorporated by reference.

TECHNICAL FIELD

The disclosure relates in general to a display system, and more particularly to a head-up display (HUD).

BACKGROUND

For a display device needing to show both an image and the background therebehind, a transparent or translucent reflecting screen (glass window or windshield) is usually used for reflecting images. For example, the display device is a head-up display (HUD) or shows a commercial advertisement, and the image is provided by a projecting device or a display. However, an observer may receive the same image reflected by different surfaces of the reflecting screen, which generates a ghost image caused by overlapping the reflected images and greatly affects the image quality.

Figure 1:
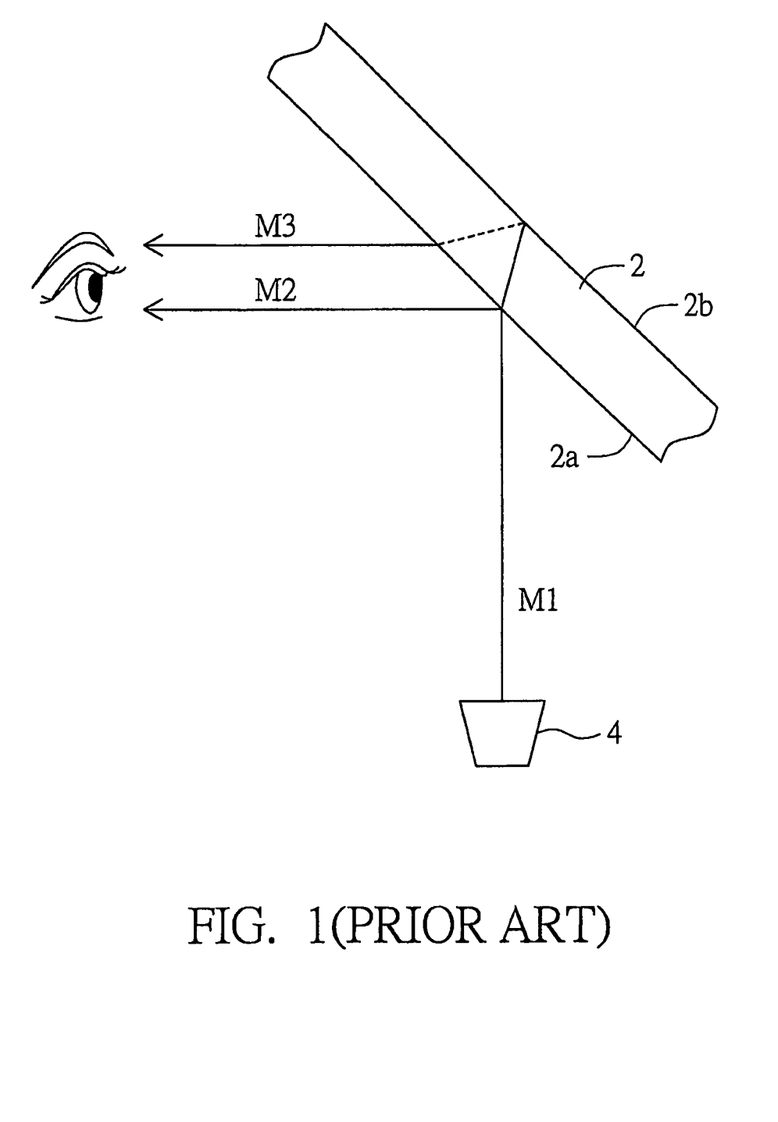
FIG. 1 illustrates a conventional head-up display.

Please refer to FIG. 1 illustrating a conventional head-up display. As shown in FIG. 1, a projecting device 4 generates an image light M1 projected toward a transparent screen 2, such as a glass window or a windshield. A portion of the image light M1 is directly reflected by a reflecting surface 2a and produces a reflecting image light M2. Another portion of the image light M1 enters the transparent screen 4 and is reflected by a reflecting surface 2b. Then, the portion of the image light M1 passes through the reflecting surface 2a and produces a reflecting image light M3. When the observer receives both the reflecting image light M2 and M3, an overlapping ghost image is generated, which causes difficulty in identifying the image.

Therefore, it is important to reduce the ghost image resulted from multi-reflection for improving the image quality of such kind of display device.

SUMMARY

The disclosure is directed to a display system for changing the polarizing directions of the reflecting image light reflected by different surfaces and the multi-reflected image light. As a result, the image quality is improved.

According to the present disclosure, a display system including an image device, an image reflecting element and a polarizing element is provided. The image device is used for producing a polarized image light. The image reflecting element includes a substrate and a phase modulating element. The phase reflecting element is adjacent to the substrate and has a reflecting surface for receiving the polarized image light. After the polarized image light is projected to the reflecting surface, the reflecting surface reflects a portion of the polarized image light to produce a first reflecting polarized image light. Another portion of the polarized image light is projected into the phase modulating element, reflected by the substrate and then projected out of the reflecting surface to produce a second reflecting polarized image light. The phase difference between the first reflecting polarized image light and the second reflecting polarized image light is substantially equal to $n\pi$, wherein n is a positive odd number. The polarizing element is for receiving and allowing the first reflecting polarized image light to pass through, and blocking the second reflecting polarized image light.

According to the present disclosure, a display system including an image device, a transparent substrate and a phase modulating element is provided. The phase modulating element is adjacent to the transparent substrate and has a reflecting surface for receiving a polarized image light. After the polarized image light is projected to the reflecting surface, the reflecting surface reflects a portion of the polarized image light to produce a reflecting polarized image light. Another portion of the polarized image light is projected to the phase modulating element and becomes an incident polarized image light having a desired polarizing direction. Thus most of the incident polarized image light is transmitted into the transparent substrate.

According to the present disclosure, a display system including an image device, a transparent substrate, and a phase modulating element is provided. The image device produces polarized image light. The transparent substrate has a first surface and a second surface disposed opposite the first surface. The phase modulating element is disposed on the first surface of the transparent substrate. A portion of the polarized image light is reflected by the phase modulating element and then emitted in an observation direction, and the other portion of the polarized image light is transmitted into the phase modulating element and is mostly emitted from the second surface of the transparent substrate.

The disclosure will become apparent from the following detailed description of the preferred but non-limiting embodiments. The following description is made with reference to the accompanying drawings.

DETAILED DESCRIPTION

First Embodiment

Figure 2:
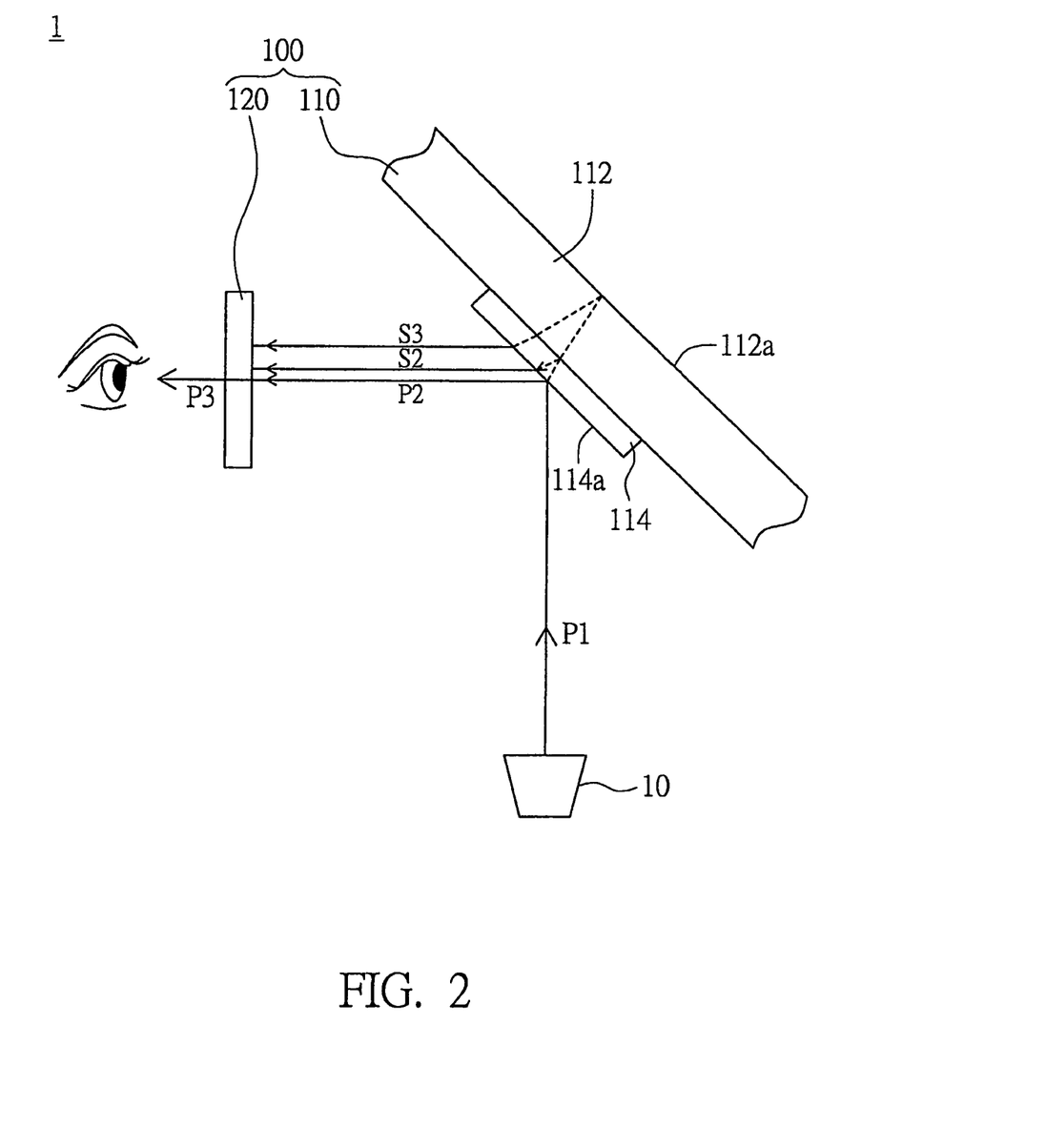
FIG. 2 illustrates a display system according to a first embodiment.

Please refer to FIG. 2 illustrating a display system 1 according to a first embodiment. As shown in FIG. 2, the ghost image reducing device 100 includes an image reflecting element 110 and a polarizing element 120. The image reflecting element 110 includes a substrate 112 and a phase modulating element 114. The phase modulating element 114 is adjacent to the substrate 112 and has a reflecting surface 114a.

As shown in FIG. 2, the ghost image reducing device 100 and an image device 10 compose a display system 1, that is, a head-up display. The image device 10 generates a polarized image light P1. For example, the image device 10 can be a liquid crystal display panel, and the polarized image light P1 can be generated by the liquid crystal display panel. Or, the image device 10 can be an image generating device incorporated with an image polarizing element, and the polarized image light P1 can be generated by an image light generated by the image generating device and then passing through the image polarizing element. When the polarized image light P1 is projected to the reflecting surface 114a, a portion of the polarized image light P1 is reflected by the reflecting surface 114a for producing a first reflecting polarized image light P2. The first reflecting polarized image light P2 and the polarized image light P1 have the same polarizing direction. After projected into the phase modulating element 114 and reflected by the substrate 112, another portion of the polarized image light P1 is projected out of the reflecting surface 114a for producing a second reflecting polarized image light S2.

Preferably, the polarized image light P1 is a linearly-polarized image light, such as a p-type linearly-polarized image light, which means the polarizing direction of the light is parallel to plane defined by the propagation directions of the incident light and the reflecting light. Or, the polarized-image light P1 can be an s-type linearly-polarized image light, which means the polarizing direction of the light is perpendicular to the plane defined by the propagation directions of the incident light and the reflecting light. In the present embodiment, the polarized image light P1 is exemplified by a p-type linearly-polarized image light. But the present embodiment is not limited thereto. The polarized image light can be a linearly polarized image light categorized neither p-type nor s-type linearly-polarized image light. The polarized image light can be a circularly polarized image light or an elliptically polarized image light, too.

Preferably, the substrate 112 is a transparent substrate, such as a transparent glass plate or a transparent plastic plate. The phase modulating element 114 is for example a quarter-wave plate made of polymer material and attached to the substrate 112. Or, the phase modulating element 114 is a quarter-wave coating layer disposed on the substrate 112. Therefore, when a portion of the polarized image light P1 enters and then is projected out of the phase modulating element 114, a phase retardation or a phase difference of 180 degrees ($\pi$) is generated between the second reflecting polarized image light S2 and the polarized image light P1. Otherwise, a phase retardation or a phase difference of $n\pi$ is generated between the second reflecting polarized image light S2 and the polarized image light P1, wherein n is a positive odd number selected from 1, 3, 5 . . . . The polarizing direction of the first reflecting polarized image light P2 and that of the second reflecting polarized image light S2 are substantially perpendicular to each other. In other words, the second reflecting polarized image light S2 is an s-type linearly-polarized image light.

As shown in FIG. 2, the first reflecting polarized image light P2 and the second reflecting polarized image light S2 are projected to the polarizing element 120 altogether. Preferably, the polarizing element 120 is a p-type polarizer, which allows the first reflecting polarized image light P2 passing through to from a received polarized image light P3 and meanwhile blocks the second reflecting polarized image light S2. Likewise, even a portion of polarized image light P1 passes through phase modulating element 114, and then reflected by the reflecting surface 112a of substrate 112 and passes through phase modulating element 114 to produce a third reflecting polarized image light S3, the polarizing direction of the third reflecting polarized image light S3 and that of the first reflecting polarized image light P2 are substantially perpendicular to each other. Therefore, the third reflecting polarized image light S3 can not pass through polarizing element 120. Though the quarter-wave plate is used in the present embodiment as an example, the present disclosure is not limited thereto. As long as the retardation wavelength of the wave plate satisfies the formula (I), the same phase retardation can be generated.

$$\frac{1}{4}\lambda + \frac{1}{2}n \cdot \lambda \quad (1)$$

n is zero or a positive integer. $\lambda$ is the wavelength of the second reflecting polarized image light.

Furthermore, even the polarized image light is not categorized either p-type or s-type linearly-polarized image light, the polarizing direction of the first reflecting polarized image light and that of the second reflecting polarized image light are still perpendicular to each other. When the first reflecting polarized image light is reflected by the reflecting surface 114a, the first reflecting polarized image light will be different in phase angle by 180 degrees compared with the polarized image light. Therefore, as long as the polarizing axis of the polarizing element 120 is consistent with the polarizing direction of the first reflecting polarized image light, the polarizing element can still allow the first reflecting polarized image light to pass through and block the second reflecting polarized image light.

Besides, if the polarized image light is circularly or elliptically polarized image light, the rotating direction of light of the first reflecting polarized image light and that of the second polarized image light which pass through the quarter-wave plate will be opposite. Therefore, as long as a circularly polarizing plate whose rotating direction of light is consistent with that of the first reflecting polarizing light is adopted as the polarizing element, the circularly polarizing plate can still allow the first reflecting polarized image light to pass through and block the second reflecting polarized image light.

Furthermore, though the present embodiment uses a linearly-polarized image light as an example, the present embodiment can be applied to a circularly-polarized image light or an elliptically-polarized image light. As long as the first reflecting light and the second reflecting light have different polarizing directions when passing through the polarizing element 120 so that the polarizing element 120 allows the first reflecting polarized image light to pass through and blocks the second reflecting polarized.

Therefore, as long as the reflecting polarized image light passes through the phase modulating element 114, the polarizing element 120 is able to block such light to avoid ghost image resulted from multi-reflection.

Moreover, when the polarized image light P1 is a light of color, the wavelength of the phase modulating element 114 can be taken in the middle band, such as the wavelength of green light, for reducing color shift.

Second Embodiment

Figure 3:
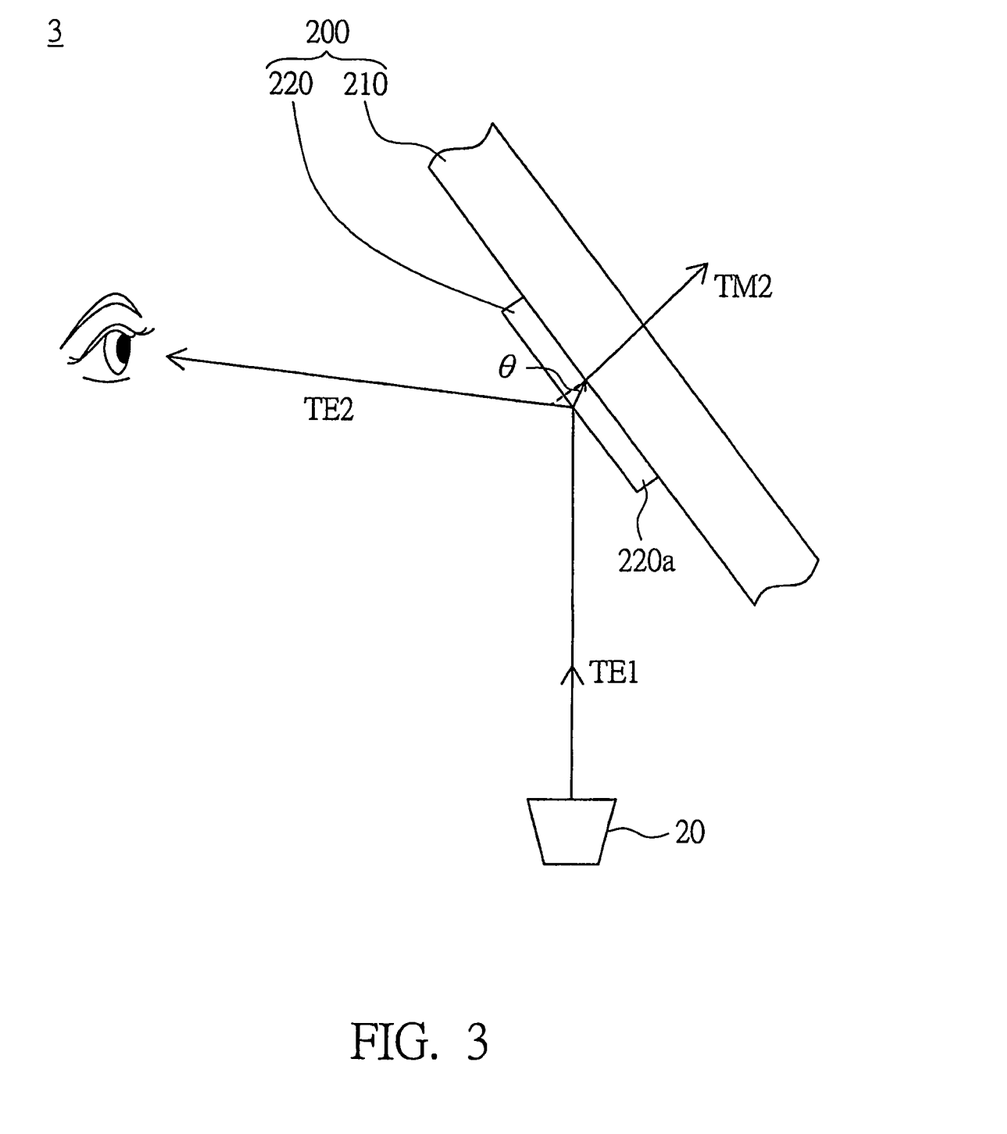
FIG. 3 is a schematic illustration showing a display system according to a second embodiment.

FIG. 3 is a schematic illustration showing a display system 500 according to a second embodiment. As shown in FIG. 3, the display system 500 includes a transparent substrate 530, a phase modulating element 510 and an image device 502. In this embodiment, the phase modulating element 510 is, for example, a quarter-wave plate, the transparent substrate 530 is a glass substrate or plastic substrate, and the image device produces a polarized image light, e.g. a circularly polarized image light or an elliptically polarized image light. Referring to FIG. 3, the transparent substrate 530 has a first surface 530A and a second surface 530B disposed opposite the first surface 530A. The phase modulating element 510 is disposed on the first surface 530A of the transparent substrate 530. The phase modulating element 510 has an upper surface 510B and a lower surface 510A disposed opposite the upper surface 510B. In other embodiments, the transparent substrate may be a substrate being transmittable with respect to the light projected to the substrate.

The circularly polarized image light or elliptically polarized image light, produced from the image device 502, is projected to the phase modulating element 510 with an incident angle θ1 being a Brewster's angle of at the interface from air to the phase modulating element 510. A portion of the circularly polarized image light or elliptically polarized image light (marked as light L1) is reflected by the lower surface 510A of the phase modulating element 510 and then propagated in an observation direction D1 so that an observer 540 can see the corresponding image. Another portion of the circularly polarized image light or elliptically polarized image light (marked as light L2) is transmitted into the phase modulating element 510 and is projected to the transparent substrate 530.

Figure 4:
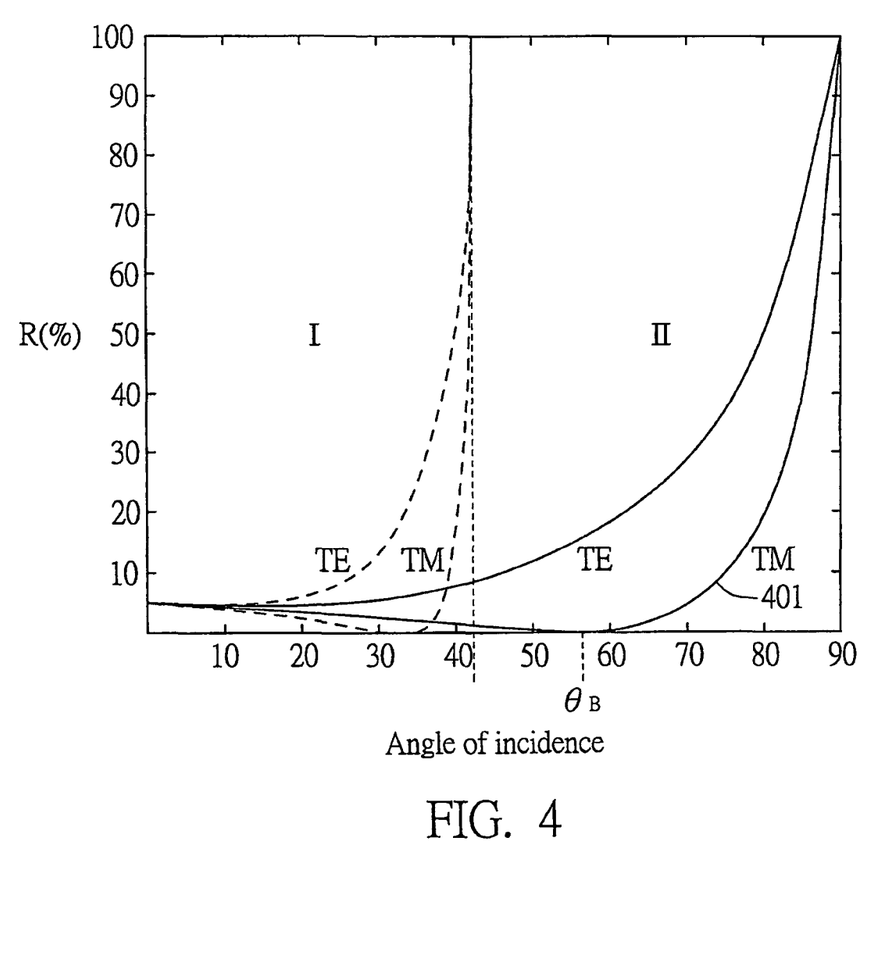
FIG. 4 shows reflectance of the ghost image reducing device of the second embodiment of the disclosure for TE electromagnetic wave and TM electromagnetic wave under different incident angles.

Furthermore, the refraction index of the phase modulating element and transparent substrate are close or similar, the both element could be assumed substantially flat plate. The incident angle θ1 of polarized light at the interface from the air to the phase modulating element 510 is close or equal to the Brewster angle from the air to the phase modulating element 510. Then the incident angle of the polarized light at the interface from the transparent substrate 530 to the air is also close to the Brewster angle from the transparent substrate 530 to the air. Please refer to FIG. 4. FIG. 4 shows reflectance of both the TE electromagnetic wave and TM electromagnetic wave under different incident angles. As shown in FIG. 4, zone I represents the scenario that light enters the air from the transparent substrate 530. Zone II represents the scenario that light enters the phase modulating element 510 from the air. In the scenario of zone II, as a curve 401 shows, the Brewster's angle $θ_B$ of TM electromagnetic wave is about 56 degrees. Therefore, the location of the image device 502 can be adjusted to make the incident angle θ1 of the polarized image light close to the Brewster's angle $θ_B$, for reducing the reflectance of the incident polarized image light TM from the transparent substrate 530.

The circularly polarized image light or elliptically polarized image light L2 processed by the phase modulating element 510 becomes linear polarized light, such as P-polarized image light or TM electromagnetic wave. The P-polarized image light or TM electromagnetic wave, propagated from the upper surface 510B of the phase modulating element 510, is incident to the transparent substrate 530. Because the incident angle θ1 of the circularly polarized image light or elliptically polarized image light on the phase modulating element 510 is the Brewster's angle at the interface from the air to the phase modulating element 510, and the first surface 530A is substantially parallel to the second surface 530B, its incident angle θ2 is also equal or close to the Brewster's angle at the interface from the transparent substrate 530 to the air when it is projected to the second surface 530B of the transparent substrate 530. Thus, most of the P-polarized image light of the second surface 530B, projected to the transparent substrate 530 from the phase modulating element 510, penetrates through the second surface 530B and is then propagated out from the transparent substrate 530.

Thus, P-polarized image light reflected by the second surface 530B is very little. Thus, the observer 540 almost cannot see the light reflected by the transparent substrate 530, and the production of the ghost image can be effectively avoided.

Furthermore, the image device 502 may be achieved by a display capable of directly producing the circularly polarized image light or elliptically polarized image light. Alternatively, the image device 502 may be achieved by a display 520 and a quarter-wave plate 550. The quarter-wave plate 550 is one kind of the phase retardation plate. The quarter-wave plate 550 is disposed on an image light output side of the display 520. In this embodiment, the quarter-wave plate 550 is adjacent to the display 520. The original image light, emitted from the display 520 and passing through the quarter-wave plate 550, is produced into the circularly polarized image light or elliptically polarized image light to be projected to the phase modulating element 510. The original image light is, for example, the linearly-polarized image light. The linearly-polarized image light, emitted from the display 520 and processed by the quarter-wave plate 550, is produced into the circularly polarized image light or elliptically polarized image light.

The display system 500 may further include an angle adjusting device 504 for adjusting an angle between the optical axis of the quarter-wave plate 550 and the polarized direction of the display 520 to enhance the purity of the P-polarized light generated by the phase modulating element 510. The angle adjusting device 504 may be a rotating mechanism, such as a rotatable disk capable of supporting the quarter-wave plate 550. The angle adjusting device 504 may also be a clamping mechanism for clamping two sides of the quarter-wave plate 550 to rotate, for example.

The phase modulating element 510, for example the quarter-wave plate, may also be replaced with a phase modulating element having the function similar to that of the phase modulating element 510. Compared with the conventional method, in which the half-wave plate or the reflective polarizer has to be inserted into the middle of the windshield using special processes, this embodiment advantageously has the simple manufacturing processes and can be easily implemented in the product.

Third Embodiment

Figure 5:
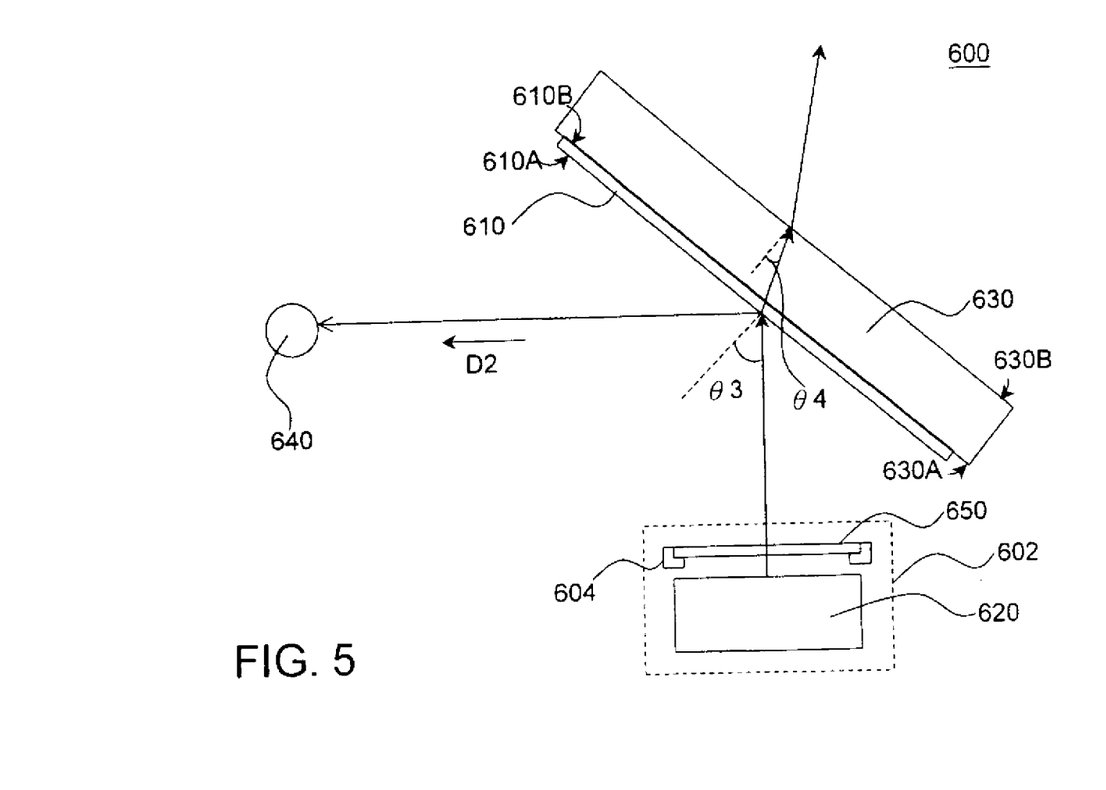
FIG. 5 is a schematic illustration showing a display system according to a third embodiment.

FIG. 5 is a schematic illustration showing a display system 600 according to a third embodiment of the disclosure. As shown in FIG. 5, the display system 600 includes a transparent substrate 630, a phase modulating element 610 and an image device 602. The transparent substrate is the glass substrate or the plastic substrate. The differences between the third and second embodiments are that the phase modulating element is the half-wave plate, and the polarized image light produced by the image device 602 is the linear-polarized image light in the illustrated example of the third embodiment. The linear-polarized image light is, for example, the S-polarized image light or TE electromagnetic wave. Referring to FIG. 5, the display system 600 includes an image device 602, a transparent substrate 630 and a phase modulating element 610. The transparent substrate 630 has a first surface 630A and a second surface 630B disposed opposite the first surface 630A. The phase modulating element 610 is disposed on the first surface 630A of the transparent substrate 630. The phase modulating element 610 has an upper surface 610B and a lower surface 610A disposed opposite the upper surface 610B.

The S-polarized image light produced by the image device 602 is projected to the phase modulating element 610 with the incident angle θ3 being the Brewster's angle at the interface from the air to the phase modulating element 610. A portion of the S-polarized image light is reflected by the lower surface 610A of the phase modulating element 610, and then emitted in an observation direction D2 so that an observer 640 can see the corresponding image. The other portion of the S-polarized image light is transmitted into the phase modulating element 610 and projected to the transparent substrate 630.

The S-polarized image light, processed by the phase modulating element 610, turns into the P-polarized image light or TM electromagnetic wave. The P-polarized image light is emitted from the upper surface 610B of the phase modulating element 610 and then incident to the transparent substrate 630. Because the incident angle θ3 of the S-polarized image light on the phase modulating element 610 is the Brewster's angle and the first surface 630A is substantially parallel to the second surface 630B, the incident angle θ4 thereof projected to the second surface 630B of the transparent substrate 630 is also close or equal to the Brewster's angle at the interface from the transparent substrate to the air. The refractive indexes of the phase modulating element and the transparent substrate are close or similar. Thus, the P-polarized image light, projected from the phase modulating element 610 to the second surface 630B of the transparent substrate 630, is mostly transmitted into the second surface 630B and then emitted from the transparent substrate 630.

Thus, most of the P-polarized image light incident to the second surface 630B of the transparent substrate 630 is emitted from the transparent substrate 630, and the P-polarized image light reflected by the second surface 630B is very little. Consequently, the observer 640 almost cannot see the light reflected by the transparent substrate 630, so that the production of the ghost image can be effectively avoided.

Furthermore, the image device 602 is achieved by a display capable for producing the S-polarized image light directly or achieved by a display 620 and a half-wave plate 650. The half-wave plate 650 is a kind of the phase retardation plate. The display 620 is, for example, the liquid crystal display (LCD), which typically producing linearly polarized image light with 45 degrees. The display 620 is also the combination of un-polarized display and the polarizer. The linearly polarized image light is generated by the light passing through the polarizer from the un-polarized display. The half-wave plate 650 is disposed on an image light output side of the display 620. In this embodiment, the half-wave plate 650 is adjacent to the display 620. The original image light emitted from the display 620 passes through the half-wave plate 650 is modulated to linearly polarized image light, for example, the S-polarized image light and projected to the phase modulating element 610.

The display system 600 may further include an angle adjusting device 604 for adjusting an angle between the optical axis of half-wave plate and polarized direction of the display 620 to enhance the purity of the P-polarized light modulated by the phase modulating element 610. The angle adjusting device 604 may be a rotating mechanism, such as a rotatable disk capable of supporting the half-wave plate 650. The angle adjusting device 604 may be, for example, a clamping mechanism for clamping two sides of the half-wave plate 650 to rotate.

The phase modulating element 610, for example the half-wave plate, is made of a double refractive material and may be disposed on the transparent substrate 630 by way of resting, adhering or sputtering, and disposed between the transparent substrate 630 and the observer 640. The phase modulating element 610 may also be replaced with a phase modulating element having the function similar to that of the phase modulating element 610, for example the half-wave plate. Compared with the conventional method, in which the half-wave plate or the reflective polarizer has to be inserted into the middle of the windshield using special processes, this embodiment advantageously has the simple manufacturing processes and can be easily implemented in the product.

Fourth Embodiment

Figure 6:
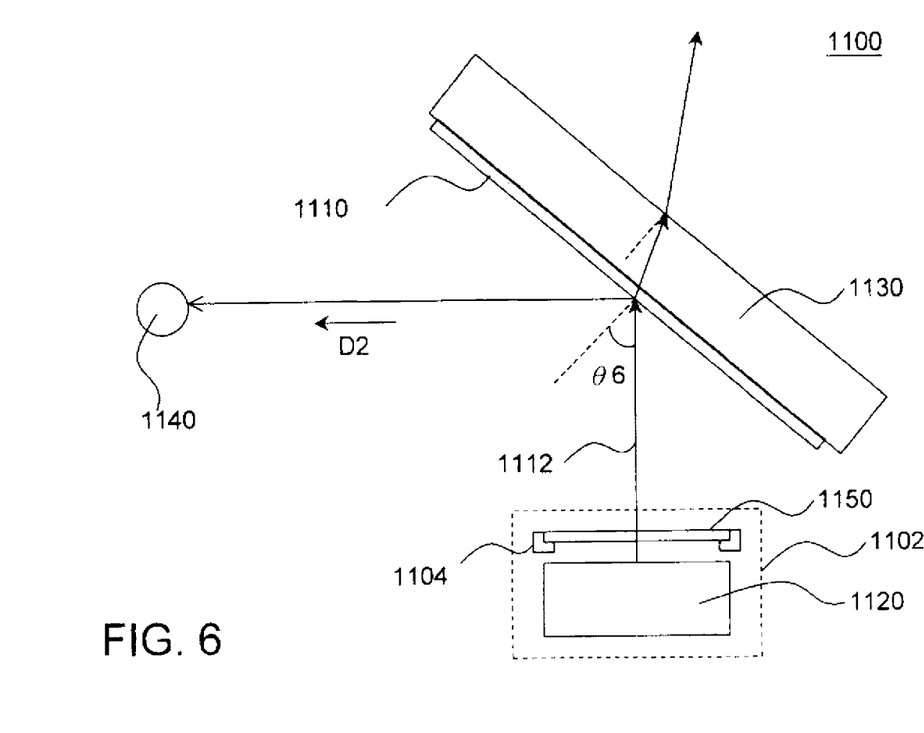
FIG. 6 is a schematic illustration showing a display system 1100 according to a fourth embodiment.

FIG. 6 is a schematic illustration showing a display system 1100 according to a fourth embodiment of the disclosure. As shown in FIG. 6, the display system 1100 includes a transparent substrate 1130, a phase modulating element 1110 and an image device 1102. The phase modulating element 1110 is for example the half-wave plate. The difference between the fourth and the third embodiments is that the image device 1102 is achieved by a display 1120 and a quarter-wave plate 1150. The display 1120 is capable of generating elliptically polarized image light or circularly polarized image light. The quarter-wave plate 1150 is disposed on an image light output side of the display 1120. Therefore, the light emitted from the quarter-wave plate 1150 will be linearly-polarized light 1112.

The linearly polarized image light 1112 is projected to the phase modulating element 1110 with the incident angle θ6 being near or equal to the Brewster's angle. A portion of the linearly-polarized image light 1112 is reflected by the phase modulating element 1110, and then emitted in an observation direction D2 so that an observer 1140 can see the corresponding image. The other portion of the linearly-polarized image light 1112 is transmitted into the phase modulating element 1110 and projected to the transparent substrate 1130. Most of the light projected to the transparent substrate 1130 passes through the transparent substrate 1130 and projected out of the transparent substrate 1130, so that the production of the ghost image can be effectively avoided.

The display system 1100 may further include an angle adjusting device 1104 for adjusting an angle between an optical axis of the quarter-wave plate 1150 and the display 1120.

While the disclosure has been described by way of example and in terms of preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display system, comprising:
an image device used for producing a polarized image light;
an image reflecting element comprising:
a substrate; and
a phase modulating element adjacent to the substrate, the phase modulating element having a reflecting surface for receiving the polarized image light, wherein the reflecting surface reflects a portion of the polarized image light to produce a first reflecting polarized image light after the polarized image light is projected to the reflecting surface, another portion of the polarized image light enters the phase modulating element and is reflected by the substrate and then is projected out of the reflecting surface for producing a second reflecting polarized image light, and the phase difference between the phase of the first reflecting polarized image light and that of the second reflecting polarized image light is substantially equal to nu, and n is a positive odd number; and a polarizing element for receiving and allowing the first reflecting polarized image light to pass therethrough, and blocking the second reflecting polarized image light.

2. The system according to claim 1, wherein the substrate is a transparent substrate.

3. The system according to claim 1, wherein the phase modulating element is a quarter-wave plate or a quarter-wave coating layer disposed on the substrate.

4. The system according to claim 1, wherein the image device is a liquid crystal display panel and the polarized image light is produced by the liquid crystal display panel.

5. The system according to claim 1, wherein the image device is an image polarizing element incorporated with an image generating device, and the polarized image light is produced by an image light generated from the image generating device and then passing through the image polarizing element.

6. The system according to claim 1, wherein the polarized image light is a linearly-polarized image light, circularly polarized image light or elliptically polarized image light.

7. A display system, comprising:
an image device used for producing a polarized image light;
a transparent substrate having a first surface and a second surface opposite to the first surface; and
a phase modulating element disposed on the first surface of the transparent substrate, the phase modulating element having a reflecting surface for receiving the polarized image light, wherein the reflecting surface reflects a portion of the polarized image light to produce a reflecting polarized image light while the polarized image light is projected to the reflecting surface, another portion of the polarized image light is propagated across the phase modulating element and modulated by the phase modulating element to be an incident polarized image light having a desired polarizing direction, most of the incident polarized image light passed through the transparent substrate.

8. The system according to claim 7, wherein the first surface of the transparent substrate is substantially parallel to the second surface of the transparent substrate.

9. The system according to claim 7, wherein the polarized image light is a linearly polarized image light, and the phase modulating element is a half-wave plate or a half-wave coating layer disposed on the transparent substrate.

10. The system according to claim 9, the linearly polarized image light is S-polarized image light or TE electromagnetic wave.

11. The system according to claim 7, wherein the polarized image light is a circularly polarized image light or an elliptically polarized image light, and the phase modulating element is a quarter-wave plate or a quarter-wave coating layer disposed on the transparent substrate.

12. The system according to claim 7, wherein the image device is a liquid crystal display panel and the polarized image light is generated by the liquid crystal display panel.

13. The system according to claim 7, wherein the incident angle with which the polarized image light is projected from the image device to the phase modulating element is near or equal to the Brewster's angle at the interface from air to the phase modulating element.

14. A display system, comprising:
an image device for producing polarized image light;
a phase retardation plate disposed on the image device;
a transparent substrate having a first surface and a second surface disposed opposite the first surface;
a phase modulating element disposed on the first surface of the transparent substrate;
wherein a portion of the polarized image light is reflected by the phase modulating element and then emitted in an observation direction, and another portion of the polarized image light is transmitted into the phase modulating element and the substrate and is mostly emitted from the second surface of the transparent substrate.

15. The display system according to claim 14, wherein the image device is capable of generating linearly polarized image light, the phase retardation plate is a quarter-wave plate and the phase modulating element is a quarter-wave plate.

16. The display system according to claim 15, further comprising:
an angle adjusting device for adjusting an angle between an optical axis of the retardation plate and polarization direction of the image light.

17. The display system according to claim 14, wherein the image device is capable of generating linearly polarized image light, the phase retardation plate is a half-wave plate and the phase modulating element is a half-wave plate.

18. The display system according to claim 17, further comprising:
an angle adjusting device for adjusting an angle between an optical axis of the retardation plate and polarization direction of the image light.

19. The display system according to claim 14, wherein the image device is capable of generating elliptically polarized image light or circularly polarized image light, the phase retardation plate is a quarter-wave plate and the phase modulating element is a half-wave plate.

20. The display system according to claim 19, further comprising:
an angle adjusting device for adjusting an angle between an optical axis of the retardation plate and polarization direction of the image light.

* * * * *

UNITED STATES PATENT AND TRADEMARK OFFICE
CERTIFICATE OF CORRECTION

| | |
|---|---|
| PATENT NO. | : 8,422,112 B2 |
| APPLICATION NO. | : 12/866136 |
| DATED | : April 16, 2013 |
| INVENTOR(S) | : Li et al. |

It is certified that error appears in the above-identified patent and that said Letters Patent is hereby corrected as shown below:

On the title page under item (57) Abstract change "20 Claims, 4 Drawings Sheets" to read --20 Claims, 6 Drawing Sheets--.

In the Drawings:

Delete drawing sheets 1-4 and substitute therefor with drawing sheets 1-6. Figs 3 and 4 have been replaced. Figs 5 and 6 have been added.

Signed and Sealed this
First Day of October, 2013

Teresa Stanek Rea
*Deputy Director of the United States Patent and Trademark Office*